(12) United States Patent
Mao et al.

(10) Patent No.: US 12,147,389 B2
(45) Date of Patent: Nov. 19, 2024

(54) METHOD AND DEVICE FOR PROCESSING MEASUREMENT DATA FORMAT FILES

(71) Applicant: Robert Bosch GmbH, Stuttgart (DE)

(72) Inventors: Anping Mao, Jiangsu (CN); Liang Ma, Jiangsu (CN); Qin Gong, Jiangsu (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/823,245

(22) Filed: Aug. 30, 2022

(65) Prior Publication Data

US 2023/0065215 A1 Mar. 2, 2023

(30) Foreign Application Priority Data

Aug. 31, 2021 (CN) .......................... 202111012532.3

(51) Int. Cl.
*G06F 16/17* (2019.01)
*G06F 16/13* (2019.01)
*G06F 16/172* (2019.01)

(52) U.S. Cl.
CPC ............ *G06F 16/172* (2019.01); *G06F 16/13* (2019.01)

(58) Field of Classification Search
None
See application file for complete search history.

(56) References Cited

U.S. PATENT DOCUMENTS

| | | | | |
|---|---|---|---|---|
| 6,754,799 B2* | 6/2004 | Frank | .................. | G06F 12/0875 711/216 |
| 7,210,118 B2* | 4/2007 | Hastings | ............. | G06F 9/44521 717/130 |
| 7,631,148 B2* | 12/2009 | Fair | ........................ | G06F 16/172 711/137 |
| 7,752,181 B2* | 7/2010 | Klein | ....................... | G06F 16/22 707/692 |
| 8,161,264 B2* | 4/2012 | Arimilli | .............. | G06F 12/0862 711/204 |
| 8,162,264 B2* | 4/2012 | Certain | .................. | B64C 27/006 244/137.4 |
| 9,824,108 B2* | 11/2017 | Taylor | .................. | G06F 16/2272 |
| 11,567,919 B2* | 1/2023 | Taylor | .................. | G06F 16/2272 |
| 2003/0078930 A1* | 4/2003 | Surcouf | ............... | G11B 27/105 348/E5.099 |
| 2003/0112742 A1* | 6/2003 | Piper | .................. | G06F 16/24561 370/200 |
| 2004/0107217 A1* | 6/2004 | Hastings | .................... | G06F 8/71 |
| 2005/0154825 A1* | 7/2005 | Fair | ........................ | G06F 16/172 711/113 |

(Continued)

OTHER PUBLICATIONS

Cloud-based visual analytics for smart grids big data, Munshi Amar A et al., IEEE 2016.*

(Continued)

*Primary Examiner* — Daniel A Kuddus

(74) *Attorney, Agent, or Firm* — Maginot, Moore & Beck LLP

(57) ABSTRACT

A method for processing a Measurement Data Format ("MDF") file includes determining a file offset address of a data block of interest in the MDF file, and adding an indexing table containing a thread pointing to the file offset address to the MDF file. The method further includes sending the indexing table and data retrieved from the MDF file to a database for caching.

13 Claims, 5 Drawing Sheets

(56) References Cited

U.S. PATENT DOCUMENTS

| | | | |
|---|---|---|---|
| 2009/0198904 A1* | 8/2009 | Arimilli | G06F 12/0862 |
| | | | 711/137 |
| 2018/0032562 A1* | 2/2018 | Taylor | G06F 16/2272 |
| 2022/0066639 A1* | 3/2022 | Sheperek | G06F 3/0604 |

OTHER PUBLICATIONS

Munshi Amar A, et al.; Cloud-based visual analytics for smart grids big data; IEEE 2016.*

* cited by examiner

METHOD AND DEVICE FOR PROCESSING
MEASUREMENT DATA FORMAT FILES

This application claims priority under 35 U.S.C. § 119 to patent application no. CN 2021 1101 2532.3, filed on Aug. 31, 2021 in China, the disclosure of which is incorporated herein by reference in its entirety.

The disclosure relates to the field of processing Measurement Data Format ("MDF") files, and more particularly, to a method and a device for processing MDF files and a computer storage medium.

BACKGROUND

Currently, in vehicle research and development projects, large amounts of measurement data need to be stored and analyzed. For example, the volume of data on sustainable operation of a vehicle is roughly estimated to be as high as 1.5 PB. Such a huge amount of data are generally stored in MDF files (such as *.MF4) defined by the Association for Standardization of Automation and Measuring Systems (ASAM). An MDF file is a tree structure, which has advantages including convenient data storage, but it is inconvenient to read data from the MDF file.

For example, when an MF4 file is opened using CANAPE software, the MF4 file needs to be loaded entirely, which is too slow to meet the requirements of certain time-critical applications. In addition, no good open-source Python application programming interface is available that supports fast data reading from such large MF4 files.

SUMMARY

According to an aspect of the disclosure, a method for processing a Measurement Data Format ("MDF") file is provided, the method comprising: determining the file offset address of a data block of interest in the MDF file; adding an indexing table containing a thread pointing to the file offset address to the MDF file; and sending the indexing table and the data retrieved from the MDF file to a database for caching.

As a supplement to or a substitute for the above-described solution, in the above-described method, adding an indexing table containing a thread pointing to the file offset address to the MDF file comprises: adding an attachment block AT to the end of the MDF file, the attachment block AT comprising an indexing table, the indexing table containing a thread pointing to the file offset address.

As a supplement to or a substitute for the above-described solution, in the above-described method, the database is a block storage engine.

As a supplement to or a substitute for the above-described solution, the above-described method further comprises: selecting a different storage apparatus for storing the data depending on a frequency of use of the data.

As a supplement to or a substitute for the above-described solution, in the above-described method, when the frequency of use of the data is greater than or equal to a first threshold, the data are stored in a cache; the data are transferred to a first hard disk for caching when the frequency of use of the data is smaller than the first threshold but greater than or equal to a second threshold; and the data are transferred to a second hard disk for caching when the frequency of use of the data is lower than the second threshold.

As a supplement to or a substitute for the above-described solution, in the above-described method, a read speed of the cache is greater than a read speed of the first hard disk, and a read speed of the first hard disk is greater than a read speed of the second hard disk.

According to another aspect of the disclosure, a device for processing an MDF file is provided, the device comprising: a determining apparatus, configured to determine the file offset address of a data block of interest in the MDF file; an adding apparatus, configured to add an indexing table containing a thread pointing to the file offset address to the MDF file; and a sending apparatus, configured to send the indexing table and the data retrieved from the MDF file to a database for caching.

As a supplement to or a substitute for the above-described solution, in the above-described device, the adding apparatus is configured to add an attachment block AT to the end of the MDF file, the attachment block AT comprising the indexing table.

As a supplement to or a substitute for the above-described solution, in the above-described device, the database is a block storage engine.

As a supplement to or a substitute for the above-described solution, the above-described device further comprises: a selecting apparatus, configured to select a different storage apparatus for storing the data depending on the frequency of use of the data.

As a supplement to or a substitute for the above-described solution, in the above-described device, the selecting apparatus is configured to store the data in a cache when the frequency of use of the data is greater than or equal to a first threshold; transfer the data to a first hard disk for caching when the frequency of use of the data is smaller than the first threshold but greater than or equal to a second threshold; and transfer the data to a second hard disk for caching when the frequency of use of the data is lower than the second threshold.

As a supplement to or a substitute for the above-described solution, in the above-described device, a read speed of the cache is greater than a read speed of the first hard disk, and a read speed of the first hard disk is greater than a read speed of the second hard disk.

According to yet another aspect of the disclosure, a computer storage medium is provided, the medium comprising an instruction that, when executed, implements the method as described above.

With a solution for processing an MDF file according to an embodiment of the disclosure, data access is accelerated by adding an indexing table (the indexing table contains a thread pointing to the file offset address of a data block of interest) to the MDF file. In addition, sending the indexing table and the data retrieved from the MDF file to a database for caching is beneficial to transforming the storage management of a conventional file (that is, an MDF file) into a scalable cloud computing service, which facilitates the implementation of big data and distributed computing.

BRIEF DESCRIPTION OF THE DRAWINGS

The above-described and other objectives and advantages of the disclosure will become more fully apparent from the following detailed description taken in conjunction with the drawings, wherein the same or similar elements are denoted by the same reference numerals.

DETAILED DESCRIPTION

Figure 1:
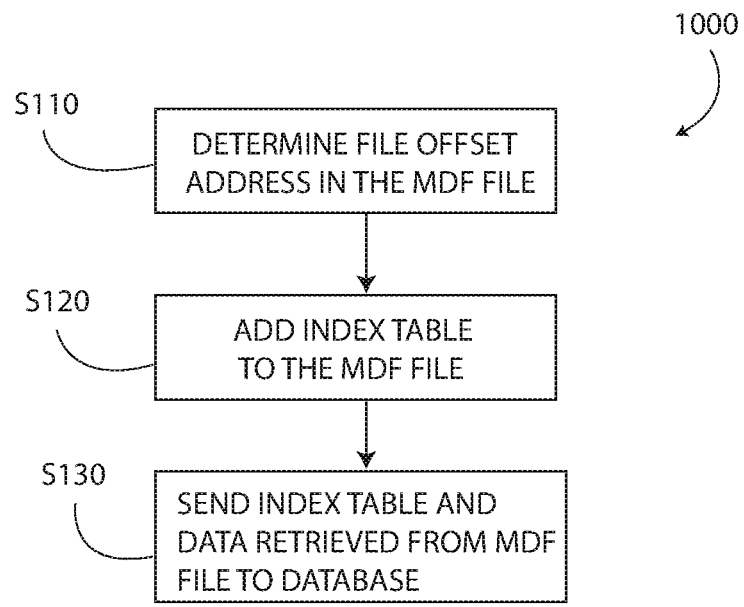
FIG. 1 is a schematic flowchart of a method for processing an MDF file according to an embodiment of the disclosure.

A solution for processing a Measurement Data Format ("MDF") file according to various exemplary embodiments of the disclosure will be further described below by referring to the drawings.

FIG. 1 is a schematic flowchart of a method 1000 for processing an MDF file according to an embodiment of the disclosure. As shown in FIG. 1, the method 1000 for processing an MDF file comprises the following steps:

Step S110 of determining the file offset address of a data block of interest in the MDF file; Step S120 of adding an indexing table containing a thread pointing to the file offset address to the MDF file; and Step S130 of sending the indexing table and the data retrieved from the MDF file to a database for caching.

In the context of the disclosure, the term "Measurement Data Format file" and the abbreviation "MDF file" refers to a binary file format for storing data from logs or calculations, for post-measurement processing, offline evaluation, or long-term storage. This format has become the de facto standard for measurement and calibration systems ("MC-systems"). As a compact binary format, ASAM MDF allows efficient and high-performance storage of mass measurement data.

In the automotive industry, it is applicable mainly in the recording of signal data during measurement, calibration and testing of an ECU system. Generally, a signal value is acquired from a sensor or transmitted by a vehicle bus system. This comprises logging ECU internal variables (for example, transmission via ASAM XCP) or logging traffic on the entire bus in the form of bus events. With the development of advanced driver-assistance systems ("ADAS"), synchronization of video data with radar information has become a new scenario, which is also supported by ASAM MDF.

Figure 3:
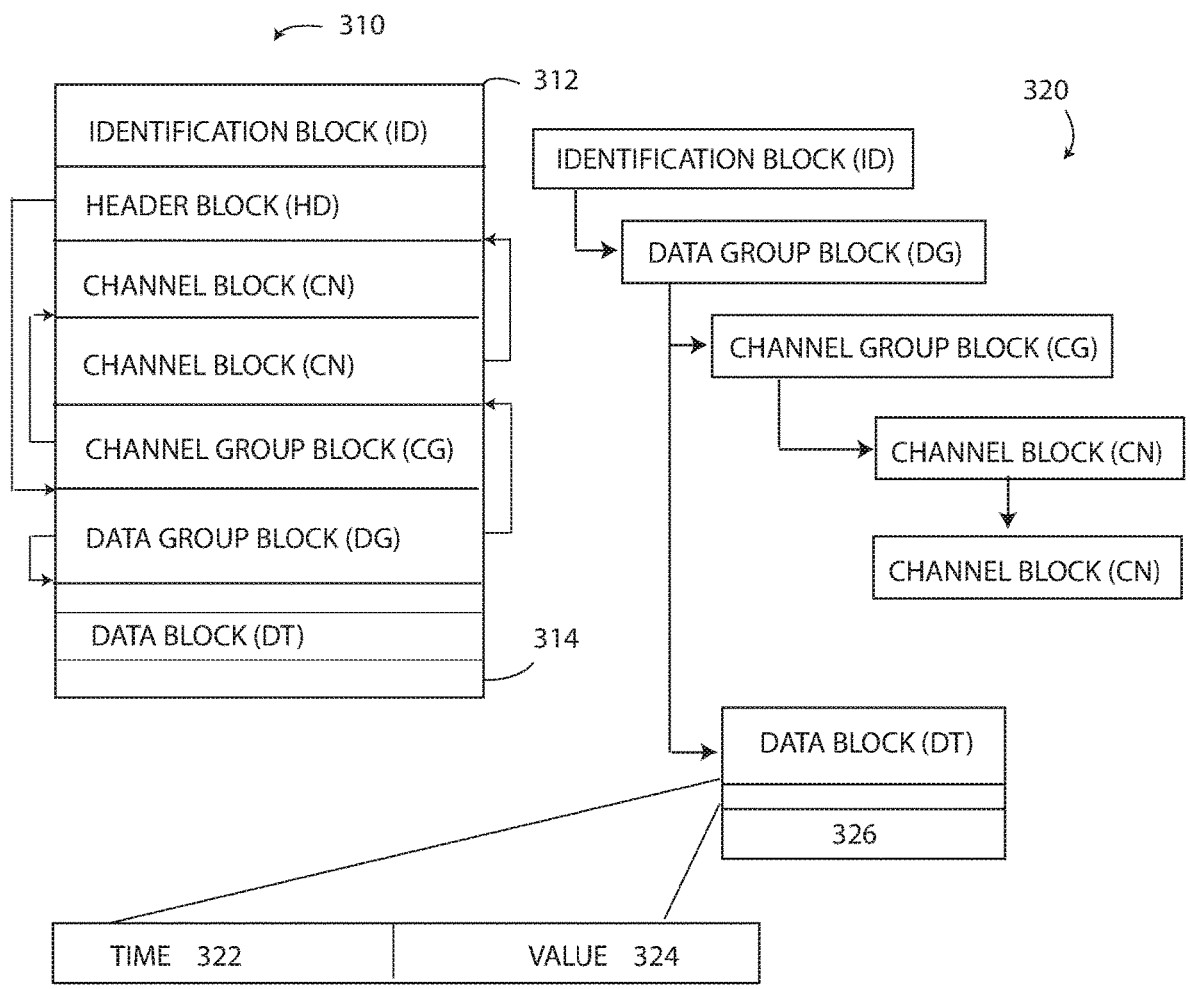
FIG. 3 is a schematic diagram of the block structure of an MDF file.

In general, an MDF file stores recorded information with a tree structure. See FIG. 3, which is a schematic diagram of the block structure of an MDF file. In the left half 310 of FIG. 3 is the physical sequence of an exemplary MDF file. 312 indicates the start of the MDF file, and 314 indicates the end of the MDF file. The MDF file contains a plurality of tree nodes, wherein each tree node is also known as a data block, data blocks are dividable into different types, respective purpose and content are defined for each block type, each block is named with an abbreviation containing two capital letters, and this name is also used as the identification of the block ("BlockID"). For example, as shown in FIG. 3, ID indicates an identification block, which is used to identify the file as an MDF file. HD indicates a header block, which is used to give a general description of the measurement file. CN indicates a channel block, which is used to give a description of a channel, that is, information about a measurement signal and information about how to store a signal value. CG indicates a channel group block, which is used to describe a channel group, that is, a plurality of channels that are always measured together. DG indicates a data group block, used to describe a data block that can designate one or more channel groups. DT indicates a data block, which is used to accommodate a data record of a signal value. In addition to the above-described blocks, an MDF file may further comprise other blocks, such as a metadata ("MD") block, a text ("TX") block, a file history ("FH") block, a channel hierarchy ("CH") block, an attachment ("AT") block, an event ("EV") block, and a source information ("SI") block.

See the right half 320 of FIG. 3, which is the hierarchical sequence of the MDF file. As shown in this hierarchy, HD represents a header block ("root"), pointing to a data group ("DG") block, which in turn points to a channel group ("CG") block and a data ("DT") block, respectively. The channel group block in turn points to a CN block (a channel block, for example, time), which in turn points to another CN block (for example, signal A). A data ("DT") block contains records described by each channel of a channel group, wherein, for example, as shown in FIG. 3, the DT block contains record 326, which contains time 322 and value (value of signal A) 324.

Figure 4:
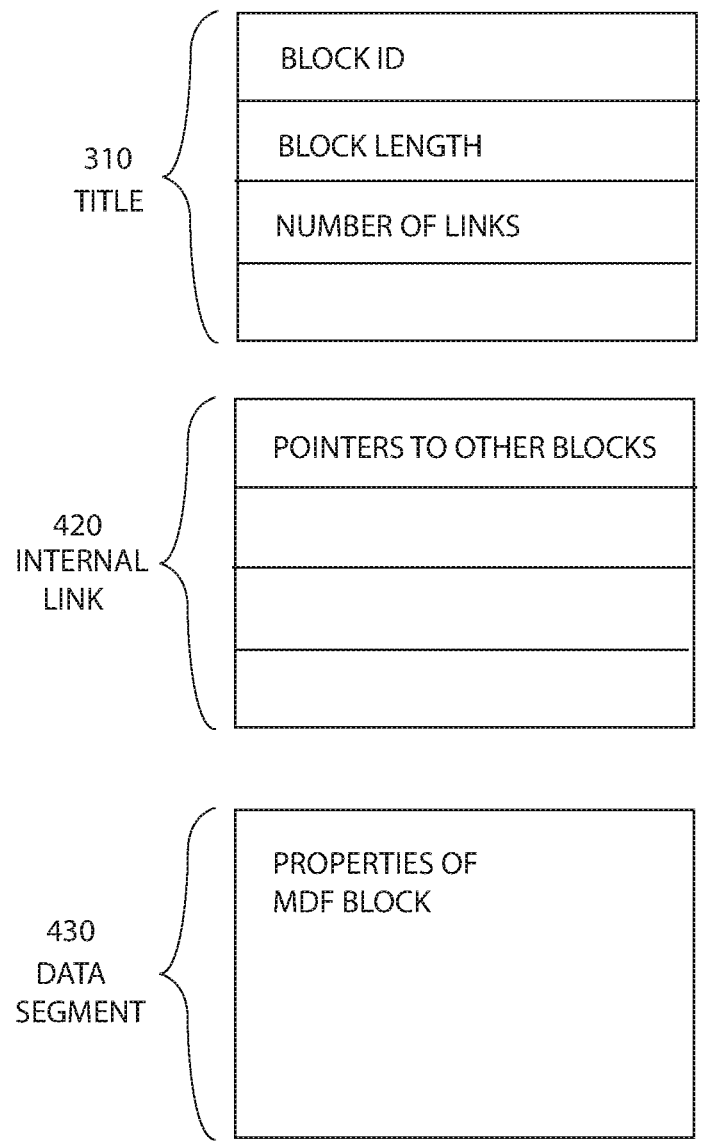
FIG. 4 is a schematic diagram of the block content of an MDF file.

FIG. 4 is a schematic diagram of the block content of an MDF file. Specifically, except the ID block, each MDF block is divided into three sections: a title 410, an internal link 420, and a corresponding data segment 430. The regular title section 410 contains a block identification ("block ID"), a block length, and the number of links in the subsequent link section. The link section 420 contains pointers to other blocks, that is, absolute byte positions in the file, forming a tree-like block hierarchy. For some block types, the link section may be empty. The data segment 430 contains other properties of the MDF block, depending on the block type (which may also be empty).

This tree-like hierarchy of an MDF file (shown in FIG. 3) makes it particularly easy to store data. For example, at the beginning of data recording, the entire tree hierarchy is stored as a template, and each piece of data may then be added to the measurement as a block, which allows a large ECU to be scalable to the use of a simple ECU with limited power.

However, this tree-like hierarchy is not conducive to the reading of data. In practice, this tree structure even degenerates further into a linear structure, further reducing the search speed. For example, with a conventional method (for example, asammdf) for reading an MDF file, all the data are loaded into a memory, which wastes a lot of time and computing resources—generally, 2.5 G of unsorted Dasy measurement data take 60 seconds to be loaded into the memory, and it takes a total of 200 seconds to perform some signal-level searches. In fact, however, there is no need to go through the whole MDF file again and again.

Therefore, in one embodiment of the disclosure, in step S110, the file offset address of a data block of interest in the MDF file is determined, and in step S120, an indexing table containing threads pointing to the file offset addresses is added to the MDF file. Thus, by introducing additional threads to index the critical paths to the data blocks of interest, the search time may be shortened and the retrieval of data of interest may be accelerated.

Figure 5:
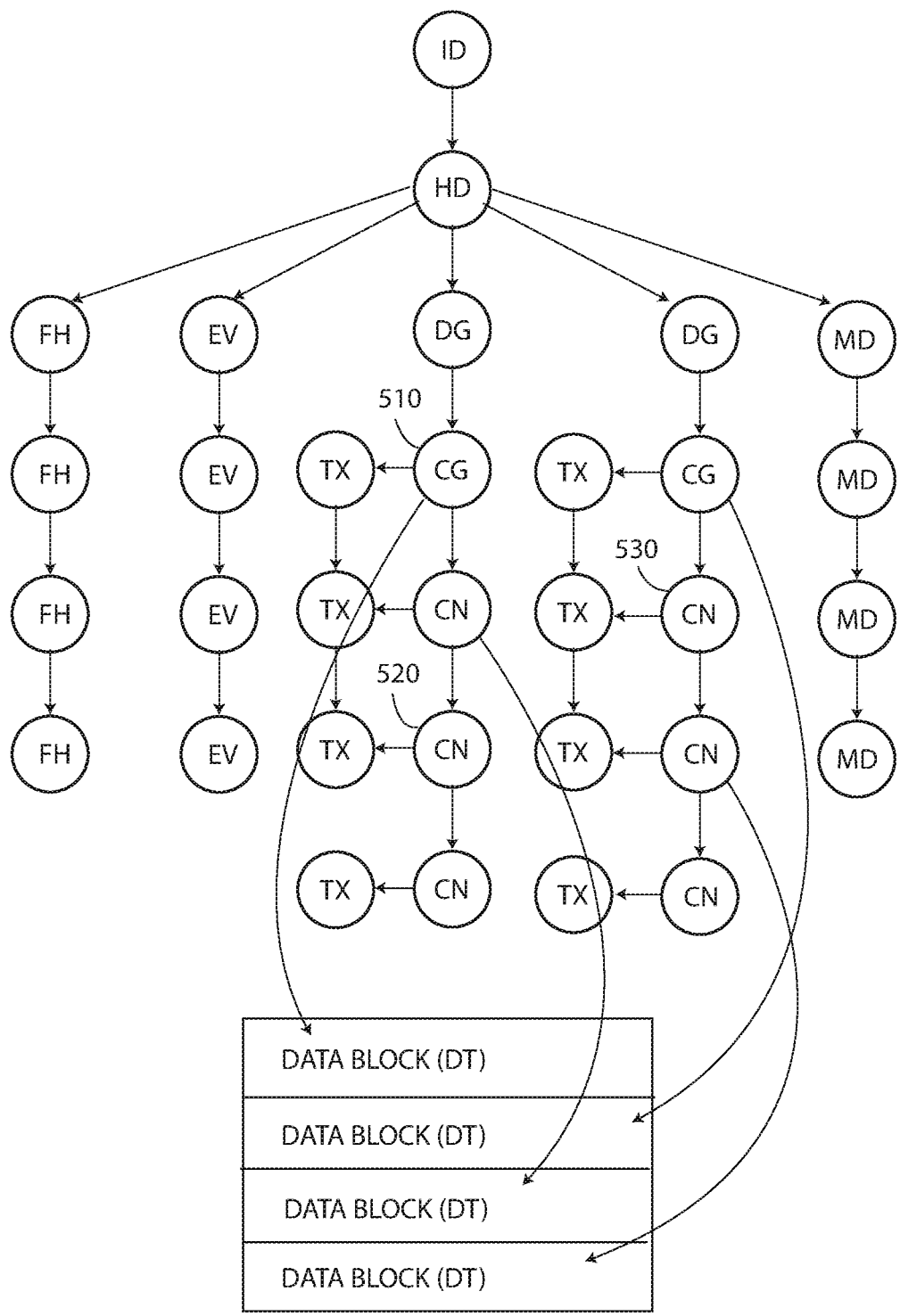
FIG. 5 is a schematic diagram of threads according to an embodiment of the disclosure.

FIG. 5 is a schematic diagram of threads according to one embodiment of the disclosure. As shown in FIG. 5, the thread 510 points to a CG block (channel group block), the thread 520 points to a CN block (channel block), and the thread 530 points to another CN block. The direction of a specific thread may be set as required, which is intended to be an example, rather than a limitation, herein.

These threads are integrated to finally form an indexing table. Data are quickly retrievable simply by traversing the indexing table, which greatly accelerates the retrieval of data of interest.

In step S130, the indexing table and the data retrieved from the MDF file are sent to a database for caching, thereby realizing the data reflow of the retrieved data, which is more beneficial to data sharing and helps improve scalability to a business oriented to cloud computing. In one or more embodiments, the database is a modern database, for example, a block storage engine. For example, after data (for example, signal-level data) is retrieved from the original MDF file via the indexing table, generally the data is not discarded after being used only once in actual engineering. Therefore, the retrieved data may be compressed and stored in a modern database capable of adopting various eviction algorithms, such as LRU and FIFO, thereby transforming conventional file storage management into a scalable cloud computing business, and then facilitating the implementation of big data and distributed computing. Another user (for example, a second user) wishing to obtain the same data can obtain the data directly from the database, without the need to search again in the complicated MDF file.

In one embodiment, step S120 comprises: adding an attachment block AT to the end of the MDF file, the attachment block AT comprising an indexing table, the indexing table containing a thread pointing to the file offset address.

Figure 6:
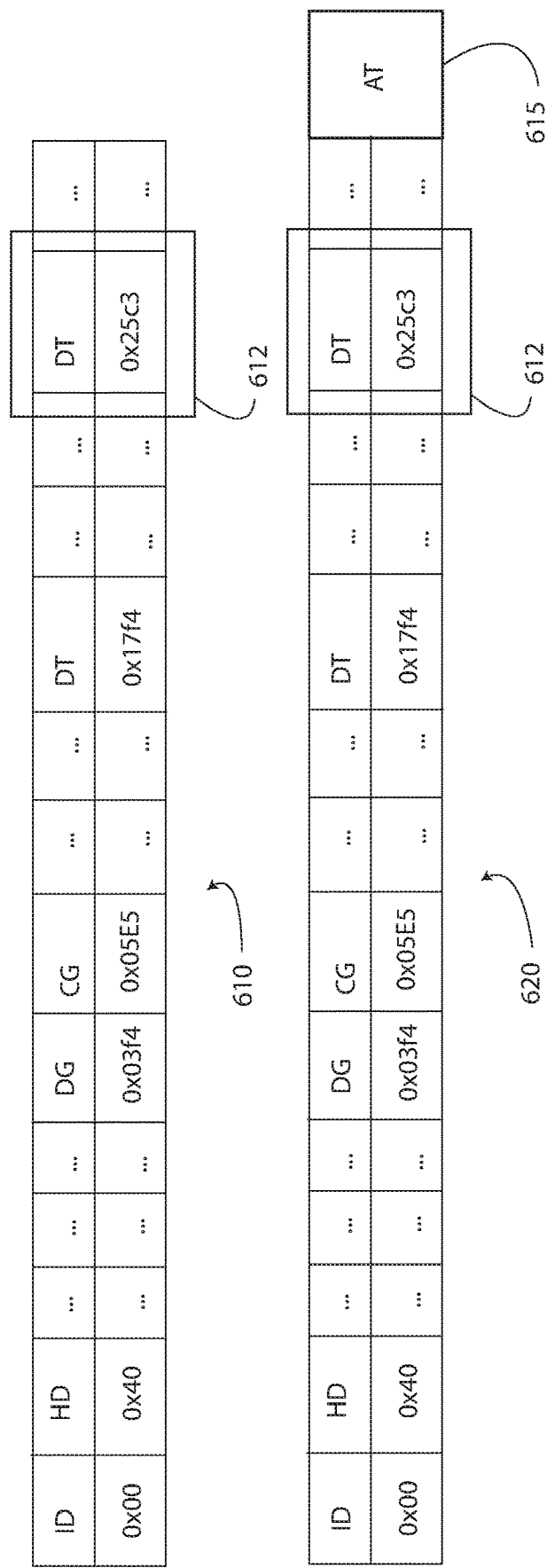
FIG. 6 is a schematic structural diagram of introducing an indexing table through an attachment block according to an embodiment of the disclosure.

See FIG. 6, which is a schematic structural diagram of introducing an indexing table through an attachment block according to an embodiment of the disclosure. As shown in FIG. 6, it is assumed that the original MDF file is structured as shown in 610, which means that if data block DT 612 is the block of interest, it is necessary to search the following in sequence: first the ID block (whose file offset address is 0×00), then the HD block (whose file offset address is 0×40), then the DG block (whose file offset address is 0×03f4) after going through a plurality of blocks, then the CG block (whose file offset address is 0×05E5), and then the data block DT 612 of interest (whose file offset address is 0×25c3) after going through a plurality of blocks. In one embodiment, since an MDF file block is flexible, an indexing table may be added as an attachment block to the end of the MDF file, as shown in the AT block 615 in the modified file structure 620. In this embodiment, the data segment portion of the AT block 615 may store an indexing table containing threads pointing to a block of interest, such as a thread pointing to the file offset address (0×25c3) of the data DT block of interest.

In one embodiment, although not shown in FIG. 1, the above-described method 1000 further comprises: selecting a different storage apparatus for storing the data depending on the frequency of use of the data. In one embodiment, when the frequency of use of the data is greater than or equal to a first threshold, the data are stored in a cache; the data are transferred to a first hard disk for caching when the frequency of use of the data is smaller than the first threshold but greater than or equal to a second threshold; and the data are transferred to a second hard disk for caching when the frequency of use of the data is lower than the second threshold.

For example, if data (for example, signal-level data) has been used frequently, then the data may be stored in a cache (for example, an expensive memory with a read speed of, for example, 10 G/s) for management, and when the data has been used less frequently, then the data may be eliminated and placed into a hot standby hard disk (whose read speed is 100 M/s, for example) for caching. If the data has remained unused for a long time, then the data may be stored on a cold standby disk (which is sometimes powered down to conserve energy, with a read speed of 10 M/s or lower).

With the method 1000 for processing an MDF file according to an embodiment of the disclosure, the retrieval of an MDF file is further optimized (for example, data retrieval is greatly accelerated) by a combination of a database and an indexing table. In addition, with the method 1000 for processing an MDF file, delayed on-demand retrieval is adopted to avoid time-consuming and difficult loading of the entire MDF file, thereby greatly reducing memory usage, CPU load and bandwidth consumption, which is beneficial to cost reduction. Moreover, retrieved data etc. may be sent to a modern database to facilitate data reflow and sharing.

In addition, it is readily comprehensible to those of ordinary skill in the art that the method 1000 for processing an MDF file provided by the above-described one or more embodiments of the disclosure may be implemented by a computer program. For example, when a computer storage medium (for example, a USB flash drive) storing the computer program is connected to a computer, the method 1000 for processing an MDF file according to one or more embodiments of the disclosure may be executed by running the computer program.

In one embodiment, the method 1000 for processing an MDF file may be implemented by a technology stack. The technology stack may comprise an application program assembly, a data access assembly, a virtual machine assembly, and a storage apparatus assembly. The application program assembly may comprise Python, MATLAB, Data portal, and ASAM cli modules, and the data access assembly may comprise SQE, Parser, Validator, Filter, and Iterator modules; the virtual machine assembly may comprise a multithread module, an asynchronous input and output module, a cache module, and an indexing module; the storage apparatus assembly may comprise a virtual file system ("VFS") module for unifying access interfaces for various file formats (including, but not limited to, NTFS, EXT4, FTP, and ZIP).

Figure 2:
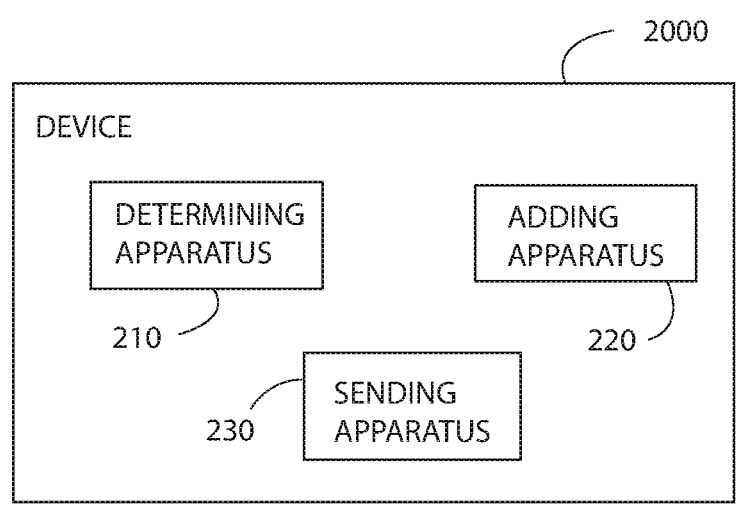
FIG. 2 is a schematic structural diagram of a device for processing an MDF file according to an embodiment of the disclosure.

See FIG. 2, and FIG. 2 is a schematic structural diagram of a device 2000 for processing an MDF file according to an embodiment of the disclosure. As shown in FIG. 2, the device 2000 for processing an MDF file comprises: a determining apparatus 210, an adding apparatus 220, and a sending apparatus 230. The determining apparatus 210 is configured to determine the file offset address of a data block of interest in the MDF file; the adding apparatus 220 is configured to add an indexing table containing a thread pointing to the file offset address to the MDF file; and the sending apparatus 230 is configured to send the indexing table and the data retrieved from the MDF file to a database for caching.

In the context of the disclosure, the term "Measurement Data Format file" and the abbreviation "MDF file" refers to a binary file format for storing data from logs or calculations, for post-measurement processing, offline evaluation, or long-term storage. This format has become the de facto standard for measurement and calibration systems (MC-systems). As a compact binary format, ASAM MDF allows efficient and high-performance storage of mass measurement data.

In the automotive industry, it is applicable mainly in the recording of signal data during measurement, calibration and testing of an ECU system. Generally, a signal value is acquired from a sensor or transmitted by a vehicle bus system. This comprises logging ECU internal variables (for example, transmission via ASAM XCP) or logging traffic on the entire bus in the form of bus events. With the development of advanced driver-assistance systems ("ADAS"), synchronization of video data with radar information has become a new scenario, which is also supported by ASAM MDF.

This tree-like hierarchy of an MDF file (shown in FIG. 3) makes it particularly easy to store data. For example, at the beginning of data recording, the entire tree hierarchy is stored as a template, and each piece of data may then be added to the measurement as a block, which allows a large ECU to be scalable to the use of a simple ECU with limited power. However, this tree-like hierarchy is not conducive to the reading of data. In practice, this tree structure even degenerates further into a linear structure, further reducing the search speed. For example, with a conventional method (for example, asammdf) for reading an MDF file, all the data are loaded into a memory, which wastes a lot of time and computing resources—generally, 2.5 G of unsorted Dasy measurement data take 60 seconds to be loaded into the memory, and it takes a total of 200 seconds to perform some signal-level searches. In fact, however, there is no need to go through the whole MDF file again and again.

Therefore, in an embodiment of the disclosure, the determining apparatus 210 is configured to determine the file offset address of a data block of interest in the MDF file; the adding apparatus 220 is configured to add an indexing table containing a thread pointing to the file offset address to the MDF file. Thus, by introducing additional threads to index the critical paths to the data block of interest, the search time may be shortened and the retrieval of data of interest may be accelerated.

The sending apparatus 230 is configured to send the indexing table and the data retrieved from the MDF file to a database for caching, thereby realizing the data reflow of the retrieved data, which is more beneficial to data sharing and helps improve scalability to business oriented to cloud computing. In one or more embodiments, the database is a modern database, for example, a block storage engine. For example, after data (for example, signal-level data) are retrieved from the original MDF file via an indexing table, generally the data are not discarded after being used only once in actual engineering. Therefore, the sending apparatus 230 may compress and store the retrieved data in a modern database capable of adopting various eviction algorithms, such as LRU and FIFO, thereby transforming conventional file storage management into a scalable cloud computing business, and then facilitating the implementation of big data and distributed computing. Another user (for example, a second user) wishing to obtain the same data can obtain the data directly from the database, without the need to search again in the complicated MDF file.

In one embodiment, the adding apparatus 220 is configured to add an attachment block AT to the end of the MDF file, the attachment block AT comprising the indexing table. As shown in FIG. 6, assuming that the original MDF file is structured as shown in 610, it is necessary to search the following in sequence: first the ID block (whose file offset address is 0x00), then the HD block (whose file offset address is 0x40), then the DG block (whose file offset address is 0x03f4) after going through a plurality of blocks, then the CG block (whose file offset address is 0x05E5), and then the data block DT 612 of interest (whose file offset address is 0x25c3). In this embodiment, since an MDF file block is flexible, the adding apparatus 220 may add an indexing table as an attachment block to the end of the MDF file, as shown in the AT block 615 in the modified file structure 620. In one embodiment, the data segment portion of the AT block 615 may store an indexing table containing a thread pointing to a block of interest, such as a thread pointing to the file offset address (0x25c3) of the data (DT) block of interest.

In one embodiment, although not shown in FIG. 2, the device 2000 for processing an MDF file further comprises: a selecting apparatus, configured to select a different storage apparatus for storing the data depending on the frequency of use of the data. For example, the selecting apparatus is configured to store the data in a cache when the frequency of use of the data is greater than or equal to a first threshold; transfer the data to a first hard disk for caching when the frequency of use of the data is smaller than the first threshold but greater than or equal to a second threshold; and transfer the data to a second hard disk for caching when the frequency of use of the data is lower than the second threshold. In one embodiment, a read speed of the cache is greater than a read speed of the first hard disk, and a read speed of the first hard disk is greater than a read speed of the second hard disk.

For example, if data (for example, signal-level data) has been used frequently, then the selecting apparatus may store the data in a cache (for example, an expensive memory with a read speed of, for example, 10 G/s) for management, and when the data has been used less frequently, then the selecting apparatus may eliminate the data and place it into a hot standby hard disk (whose read speed is 100 M/s, for example) for caching. If the data has remained unused for a long time, then the selecting apparatus may store the data on a cold standby disk (which is sometimes powered down to conserve energy, with a read speed of 10 M/s or lower).

In summary, with a solution for processing an MDF file according to an embodiment of the disclosure, data access is accelerated by adding an indexing table (the indexing table contains threads pointing to the file offset address of a data block of interest) to the MDF file. In addition, sending the indexing table and the data retrieved from the MDF file to a database for caching is beneficial to transforming the storage management of a conventional file (that is, an MDF file) into a scalable cloud computing service, which facilitates the implementation of big data and distributed computing.

Although only some embodiments of the disclosure have been described above, those of ordinary skill in the art should understand that the disclosure may be implemented in many other forms without departing from its spirit or scope. Therefore, the examples and embodiments described herein are construed as illustrative rather than restrictive and, without departing from the spirit or scope of the disclosure as defined by the attached claims, the disclosure may cover various modifications and substitutions.

What is claimed is:

1. A computer-implemented method for processing a Measurement Data Format ("MDF") file including a plurality of data blocks using a hardware processor, the method comprising:
   determining a file offset address of a data block of interest of the plurality of data blocks in the MDF file, the file offset address identifying the data block of interest;
   adding an indexing table containing a thread pointing to the file offset address to the MDF file;
   sending the indexing table and data retrieved from the MDF file to a database for caching in a cache of the database; and selecting a different storage apparatus for storing the data retrieved from the MDF file depending on a frequency of use of the data retrieved from the MDF file, wherein the selected storage apparatus is selected from the cache of the database, a first hard disk, and a second hard disk, and wherein a read speed of the cache of the database is greater than a read speed of the first hard disk, and the read speed of the first hard disk is greater than a read speed of the second hard disk.

2. The method as claimed in claim 1, wherein adding the indexing table containing the thread pointing to the file offset address to the MDF file comprises:

adding an attachment block at an end of the MDF file, the attachment block comprising the indexing table.

3. The method as claimed in claim 1, wherein the database is a block storage engine.

4. The method as claimed in claim 1, wherein:

when the frequency of use is greater than or equal to a first threshold, the data retrieved from the MDF file are stored in the cache of the database;

when the frequency of use is smaller than the first threshold but greater than or equal to a second threshold, the data retrieved from the MDF file are transferred to the first hard disk for caching; and when the frequency of use is lower than the second threshold, the data retrieved from the MDF file are transferred to the second hard disk for caching.

5. The method as claimed in claim 1, wherein the thread points to a channel group block or a channel block of the MDF file to point to the file offset address.

6. The method as claimed in claim 1, wherein the MDF file is a binary file format for storing data from logs or calculations.

7. The method as claimed in claim 1, wherein:

the MDF file includes an identification block, the indexing table, a header block, a channel group block, a channel block, a data group block, and the data block of interest, the header block points to the data group block, the data group block points to the channel group block and the data block of interest, the channel group block points to the channel block, and the data block of interest contains a record including a time and a value of a signal.

8. The method as claimed in claim 1, wherein:

the data block of interest is included in a plurality of data blocks of the MDF file, the data block of interest includes the data retrieved, and the hardware processor retrieves the data retrieved from the data block of interest directly using the file offset address from the indexing table without retrieving data from other data blocks of the plurality of data blocks.

9. A device for processing a Measurement Data Format ("MDF") file including a plurality of data blocks, comprising:

a hardware processor configured to:

determine a file offset address of a data block of interest of the plurality of data blocks in the MDF file, the file offset address identifying the data block of interest;

add an indexing table containing a thread pointing to the file offset address to the MDF file;

send the indexing table and data retrieved from the MDF file to a database for caching in a cache of the database; and select a different storage apparatus for storing the data retrieved from the MDF file depending on a frequency of use of the data retrieved from the MDF file, wherein the selected storage apparatus is selected from the cache of the database, a first hard disk, and a second hard disk, and wherein a read speed of the cache of the database is greater than a read speed of the first hard disk, and the read speed of the first hard disk is greater than a read speed of the second hard disk.

10. The device as claimed in claim 9, wherein adding the indexing table includes adding an attachment block at an end of the MDF file, the attachment block comprising the indexing table.

11. The device as claimed in claim 9, wherein the database is a block storage engine.

12. The device as claimed in claim 9, wherein the hardware processor is further configured to (i) store the data retrieved from the MDF file in the cache of the database when the frequency of use is greater than or equal to a first threshold, (ii) transfer the data retrieved from the MDF file to the first hard disk for caching when the frequency of use is smaller than the first threshold but greater than or equal to a second threshold, and (iii) transfer the data retrieved from the MDF file to the second hard disk for caching when the frequency of use is lower than the second threshold.

13. The device as claimed in claim 9, wherein the thread points to a channel group block or a channel block of the MDF file to point to the file offset address.

* * * * *